United States Patent

[11] 3,591,766

[72] Inventor Karl Nerold
St. Nikola, Austria
[21] Appl. No. 819,323
[22] Filed Apr. 25, 1969
[45] Patented July 6, 1971
[73] Assignee "Vienna" Bekleidungs Und Waschefabrik Ges.m.b.H.
Vienna, Austria
[32] Priority Aug. 7, 1968
[33] Austria
[31] A 7729/68

[54] SPOT-WELDING MACHINE FOR THERMOPLASTICALLY CONNECTING THE SEVERAL COMPONENTS OF INTERLINING ASSEMBLIES
13 Claims, 4 Drawing Figs.

[52] U.S. Cl. .......... 219/243
[51] Int. Cl. .......... H05b 1/00
[50] Field of Search .......... 219/87, 158, 243, 245; 29/493, 559; 223/2; 2/143; 53/373, 583; 156/299, 553, 556, 559, 563, 583, 280, 73, 580

[56] References Cited

UNITED STATES PATENTS

| | | | |
|---|---|---|---|
| 2,830,649 | 4/1958 | Westerkamp | 156/583 |
| 2,912,805 | 11/1959 | Maynard, Jr. | 53/37 |
| 3,013,930 | 12/1961 | Serbin | 156/583 X |
| 3,092,945 | 6/1963 | Wizelman | 156/583 X |
| 3,145,392 | 8/1964 | Lockwood et al. | 2/143 |
| 3,232,025 | 2/1966 | Haines | 156/583 X |
| 3,303,084 | 2/1967 | Schwanekamp et al. | 156/553 |
| 3,333,280 | 8/1967 | Hynek et al. | 2/143 |
| 3,406,492 | 10/1968 | Ludwig | 156/583 X |
| 3,476,632 | 11/1969 | Cornelius | 156/573 X |

FOREIGN PATENTS

| | | | |
|---|---|---|---|
| 1,311,189 | 10/1962 | France | 2/143 |
| 872,117 | 7/1961 | Great Britain | 2/143 |
| 675,128 | 7/1952 | Great Britain | 156/563 |

*Primary Examiner*—J. V. Truhe
*Assistant Examiner*—Gale R. Peterson
*Attorney*—Sughrue, Rothwell, Mion, Zinn & Macpeak

ABSTRACT: A spot-welding machine for thermoplastically connecting the several components of interlining assemblies, particularly shirt-collar interlinings, is provided which comprises a plurality of electrically heatable weld punches and a possibly likewise heatable pressplate, as well as adjustable edge-locating means for the several components of an interlining assembly, wherein the edge-locating means have the form of templates which are adapted to the shape of the several components of the interlining assembly and which are interposable between the weld punches and the pressplate of the machine.

13 10 18 8 A 7 8 12 7 3 19 7 2 5 14 15 16 17 11 8 4 6 9 8 20 1 32

8b
21
21
21
28
28
8a
22
22
25
26
23
19
19
19
19
29
29
24
30
27
28
28
28
31
31
31
III
III 8
28
18
30
22
25
24
19
22
23
27
26
29
19
22
28
8a

SPOT-WELDING MACHINE FOR THERMOPLASTICALLY CONNECTING THE SEVERAL COMPONENTS OF INTERLINING ASSEMBLIES

BACKGROUND OF THE INVENTION

This invention relates to a spot-welding machine for thermoplastically connecting the several components of interlining assemblies, such as self-bonding cornerpieces, bonding foils, interlining base members and possibly neckband bonding foils, for wearing apparel or the like, particularly collar interlinings, for instance for shifts, said machine comprising a plurality of electrically heatable weld punches and a possibly likewise heatable pressplate, as well as adjustable edge-locating means for the several components of an interlining assembly.

Spot-welding machines of the described kind are used for provisionally fixing the components of an interlining assembly in desired relative positions before they are finally connected together in a press by a process of thermoplastic bonding. The self-bonding cornerpieces, the so-called bonding foils and possibly the neckband bonding foil are all provided with a coating of thermoplastics material.

Such preparatory operations are performed for instance for making up interlinings for detachable collars, single-piece collars, sports and Lido collars, blouse collars and similar interlined parts.

Owing to the high pressure applied by the welding punches and their high welding temperature, such machines are particularly suitable for spot welding thicker multilayer interlining assemblies.

In conventional spot welding machines of the above-described kind the edge locating means consist of vertical guide pins attached to horizontally movable rails. According to the shape and type of the collar the rails must be preset by hand. The edge locating means for the left and right-hand corners of a collar can be adjusted on racks to the desired size of the collar interlinings by a control member. The locating pins are provided with circular steel discs which determine the distance between the edge of the base member of the interlining and the edge of the stiffening members that are to be bonded thereto, such as self-bonding cornerpieces. Before the base of the interlining is placed in position the steel discs are raised and retained by a leaf spring. When the base has been correctly located the steel discs are released from the leaf spring and slide down onto the base where they determine the position of the edges of the components of the interlining that are to be bonded to the base. It will therefore be understood that the several components of an interlining assembly are placed on a baseplate of the machine in the sequence interlining base, bonding foil, cornerpieces, directly underneath the weld punches which are then lowered onto the assembly and bond this together thermoplastically.

However, this known method of edge location involves a lengthy process of adjustment to the shape of the collar in question, and this adjustment can be made only by skilled personnel. Moreover, during the whole of the time that is expended in adjusting the edge-locating means and in placing the parts of the assembly in position, the spot-welding machine itself is idle. Consequently, conventional machines of this kind are very slow working and inefficient, since the spot-welding equipment is used for only part of the time owing to the extended periods of enforced idling. For continuously feeding the press which finally bonds the interlining assembly together, several spot-welding machines of the aforedescribed kind are therefore needed.

SUMMARY OF THE INVENTION

It is the object of the present invention to provide a spot-welding machine of the above-specific kind in which the laborious and time-consuming work of setting the edge-locating means can be dispensed with, and in which the welding equipment need not be inactivated whilst the individual components of each assembly are being placed in position, thereby to permit the working rhythm of a machine for the preliminary spot-welding of the interlining assembly to be sufficiently accelerated continuously to feed a following press.

According to the present invention this object is attained by the provision of edge-locating means in the form of templates which are adapted to the shape of the several components of the interlining assembly and which are interposable between the weld punches and the pressplate of the machine.

This proposal permits the several components of the interlining assembly to be inserted into an appropriate template at a point where this operation does not interfere with the spot-welding punches, and the prepared templates can then be moved to the welding station in quick succession. Whilst the assembly in one template is being spot-welded the next template can already be filled and the welding tools need not idle. Productivity can thus be substantially raised and the machine can be very efficiently operated without waste of time.

The time-consuming adjustment of the edge-locating means to each shape of collar is completely eliminated, because the templates are already of the required shape and construction. Simple means are provided merely to permit the templates to be adjusted to the particular collar size. For this purpose the template may be divided into two parts which can be relatively slidably adjusted on guide rails. In other words, the several sizes of a particular collar style can all be allowed for the provision of adjustable templates of one single type. For other styles and shapes of collar the templates need merely be replaced.

Conveniently the templates comprise three levels, the bottom level being for the reception of the self-bonding cornerpieces, whereas the intermediate level is for the reception of the bonding foil and possibly of a neckband bonding foil, the upper level being for the reception of the interlining base. Compared with conventional machines the several components of the assembly are therefore superimposed in the reverse order and this also considerably simplifies the assembling process.

Preferably each template is a plate provided with recesses and/or projections of different depths and/or heights and corresponding in shape and size of their contour to the individual components of the interlining assembly. This arrangement ensures an extremely accurate relative register of the several components of the interlining assembly and hence leads to the eventual production of a high quality collar.

In order to ensure that the machine will work continuously and as smoothly as possible, the templates are preferably exchangeably affixable to a carrier of which each end is attached to one of two intermittently driven parallel conveyor chains or the like which travel through the gap between the weld punches and the pressplate. The weld punches may be located underneath the template carriers and they may be raisable through the carriers into the openings in the template and into contact with the interlining assembly from below.

For a convenient and rapid replacement of the templates they are attachable to the carriers by pushing them over magnetic studs.

All the templates on the conveyor chains may be adjustable by a common handwheel to set them to different sizes of a particular style of collar and the handwheel may with advantage be adapted simultaneously also to reset the weld punches and the ejector fingers according to the readjusted position of the template and its openings.

DESCRIPTION OF THE DRAWINGS

Embodiments of the invention will be more particularly described with reference to the accompanying schematic drawings in which:-

DESCRIPTION OF THE PREFERRED EMBODIMENTS

Figure 1:
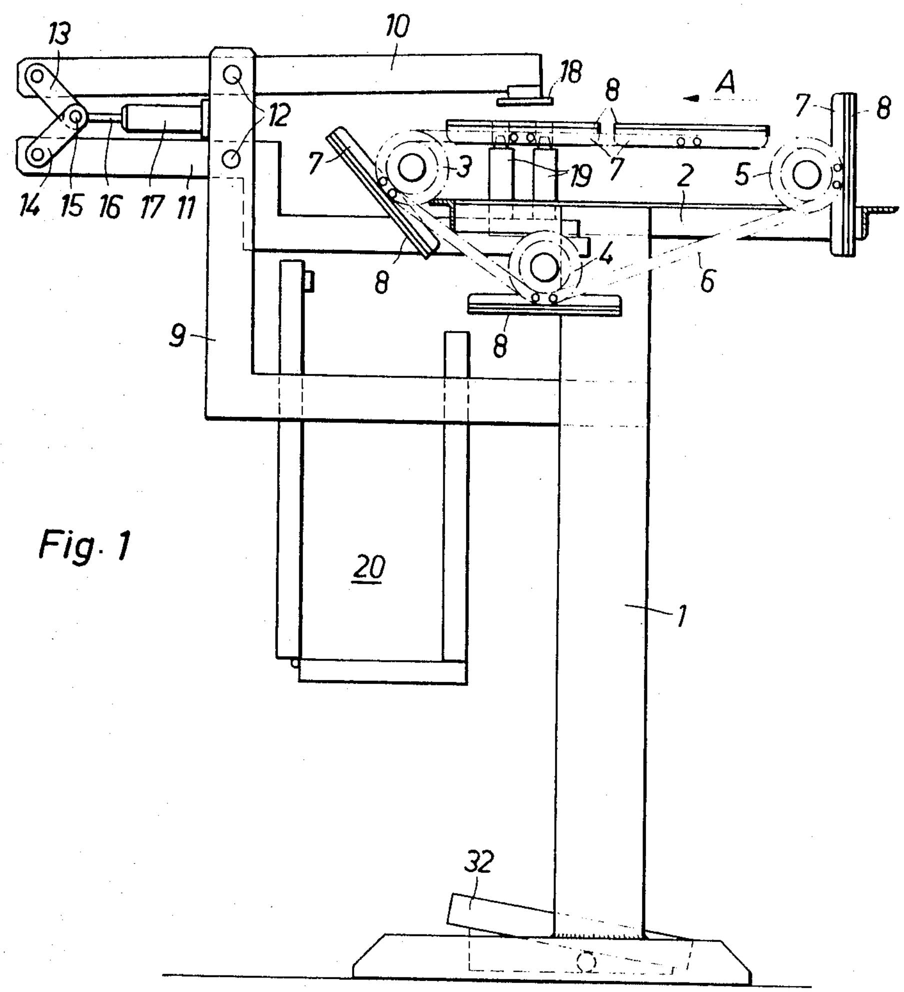
FIG. 1 is a side elevation of a spot-welding machine according to the invention.

Referring to FIG. 1 there is provided on a machine pedestal 1 a supporting framework 2 for three pairs of chain wheels 3, 4 and 5 which carry two endless conveyor chains 6 running in parallel. The pair of wheels 3 is rotatable by an intermittent drive, for instance by a geared motor, in the direction of the arrow marked A, the movement of the chains 6 being controlled by reference to the pressing operation that will be later described. Template carriers 7 attached at equal intervals crosswise to the two conveyor chains 6 are carried around by the chains. The template carriers 7 carry exchangeable templates 8 which will be hereinafter described in greater detail. Preferably the templates 8 are held on the carriers 7 by magnetic studs not shown in the drawing. This arrangement permits the templates 8 to rapidly and easily replaced.

A bracket arm 9 on the pedestal 1 carries the arms 10 and 11 of a pressing shear. The arms 10 and 11 are fulcrumed the one above the other on pivot pins 12. In apparatus of greater width two arms 10 and two arms 11 may be mounted side by side. At one of their ends the arms 10 and 11 are coupled together by a toggle lever system comprising two links 13 and 14 connected by a hinge 15. The hinge 15 between the two links 13 and 14 is connected to the piston rod 16 of one or possibly several compressed air cylinders 17 located between the arms 10 and 11 of the pressing shear and secured to the bracket arm 9. The free end or ends of the arm or arms 10 is/are provided with a pressplate 18, whereas the arm or arms 11 is/are fitted with exchangeable pressing or weld punches 19. The latter are electrically heatable and their temperature is controllable by a thermostat. The entire arrangement is such that the templates 8 that are attached to the conveyor chains 6 can be conveyed into a position between the pressplate 18 and the weld punches 19.

Near the pair of wheels 3 there is provided an ejector system, not shown in the drawing, which ejects the interlining assemblies that have been provisionally spot-welded between the pressplate 18 and the weld punches 19 from the templates 8. A collecting box 20 for the ejected interlining assemblies is affixed to the bracket arm 9.

Figure 2:
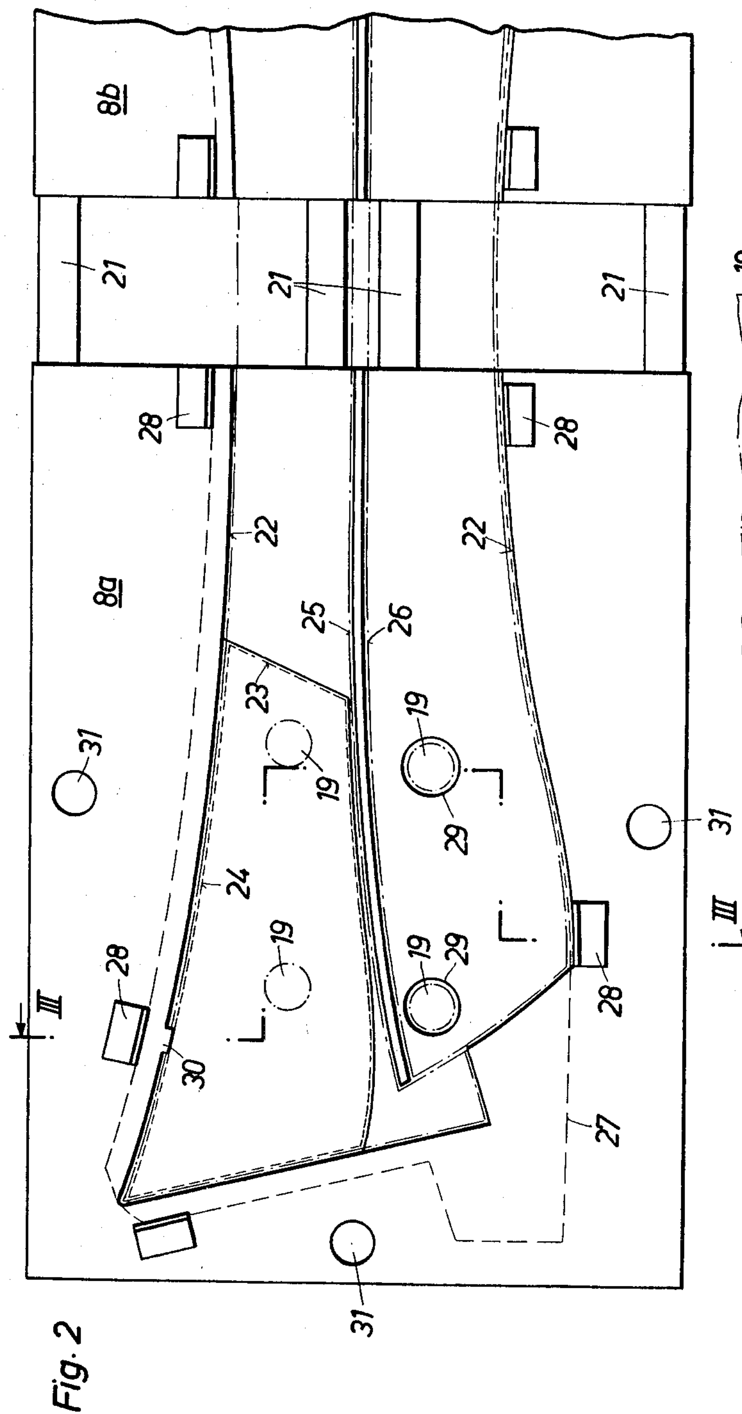
FIG. 2 is a top plan view of a template.

BY reference to FIG. 2 it will be understood that each template 8 consists of two parts 8a and 8b which are relatively adjustable on guide rails 21 to adapt them to the size of collar in question. This adjustment can be made simultaneously for all the templates on the conveyor chain 6 by means of a handwheel, not shown, and appropriate adjusting mechanism. Moreover, at the same time as this adjustment is made the ejectors and the weld punches 19 may be adjustable to the setting of the templates.

Figure 3:
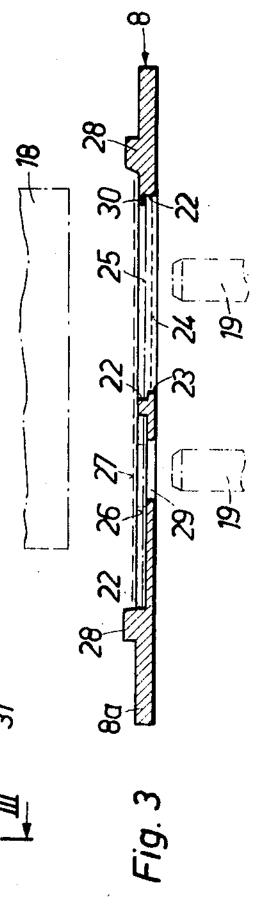
FIG. 3 is a section taken on the line III–III of FIG. 2.

The template 8, i.e. each half 8a, 8b of the template, substantially has the form of a plate containing recesses 22 and 23 of different depths (FIGS. 2 and 3). Several levels are thus formed of which each is suitable for the reception of one of the parts of the multiple layer assembly. More particularly, the deepest recess 23 serves for the reception of the corner members 24 which are shown in dotted outlines, whereas the intermediate depth recess 22 serves for the reception of the bonding foil 25 or the collar band foil 26 and the upper level, which in the illustrated embodiment is defined by the upper surface of the template 8, for the reception of the interlining base 27 shown in dot-dash lines in the drawing. The upper surface of the template 8 is also formed with projections 28 defining the edges of the interlining base 27. The sides of the projections 28 at the edges of the interlining base are preferably slightly chamfered in order to facilitate the insertion of the parts. Naturally a solid plate suitably recessed in conformity with the shape of the interlining base could be used instead of the described edge locating projections 28.

The deepest recess 23 preferably has an open bottom to permit some of the weld punches foil to be advanced through this opening into contact with the dislodged layer assembly. Circular openings 29 are provided for the other punches 19. In the illustrated embodiment each half 8a and 8b of the template is designed for cooperation with four weld punches 19 but, if desired, more openings 29 may be provided, depending upon the shape and size of the multilayer assembly. Moreover, the weld punches 19 provided for welding the collarband foil 26 may be inactiveable if such a foil is not required. Moreover, individual weld punches that are not needed may be inactivated for instance when changing over from men's to childres's shirts.

A small projection 30 is provided at the upper edge of the recess 22 for the bonding foil 25 in order to prevent this foil from being accidentally dislodged from the recess 23. Each of the halves 8a and 8b of the template is provided with additional holes 31 which serve for affixing the plate to the template carriers 7 by engaging the magnetic studs.

The template 8 may either be a solid plate containing the recesses 22 and 23 of different depths or it may consist of superimposed laminations, each lamination defining one of the levels. The material may be plastics or cardboard, the latter being preferred for a laminated type of template.

Figure 4:
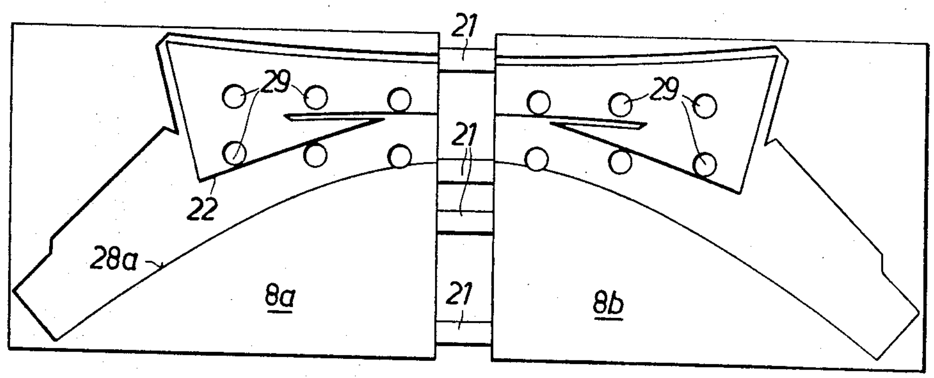
FIG. 4 is a top plan view of a modified template suitable for so-called Lido collars.

A different type of template is shown in FIG. 4, as required for a type of collar known as a Lido collar. In principle the construction of this template is the same as that of the previously described embodiment. However, the projections 28 are here replaced by a recess 28a which bounds the edges of the interlining base around its entire periphery. A larger working surface is required at the spot-welding equipment for this type of template.

The described spot-welding equipment functions as follows:-

The templates 8 on the template carrier 7 are first adjusted to the desired shape of collar by means of the hand wheel not shown in the drawing, and at the same time the weld punches 19 and the ejectors that are likewise not shown are set to the position of the openings 29 in the templates. The several parts of the multilayer assembly are then inserted into the template between the pair of chain wheels 5 and the welding station composed of the pressplate 18 and the weld punches 19, the self-bonding corners 24 being first inserted into the recess 23 having the open bottom. The bonding foil 25 and possibly the collar band foil 26 are inserted into the recesses 22 and finally the interlining base 27 is deposited on the top of the template between the projections 28. By operating a control element, such as a foot pedal 32, this template is then fed in the direction of the arrow A until it is located between the weld punches 19 and the pressplate 18, in which position it is automatically stopped. The pressing shear then closes by the automatic admission of compressed air into the cylinder or cylinders 17. The layers of material in the template are thus gripped and thermoplastically welded together between the weld punches 19 which rise through the openings 23, 29 in the template 8 and the pressplate 18. When the time required for the formation of adhesive bond has elapsed the pressing shear is reopened, for instance by the thrust of a restoring spring, not shown, and the templates 8 are advanced by one further step, causing the provisionally spot-welded multilayer assembly to be conveyed to the ejector, not shown, where ejector studs passing through the openings 23 and 29 eject the multilayer assemblies into the collecting box from which they can be removed in batches at any time whilst the machine continues to operate. The same feed motion conveys the next template 8 to the welding station and the described operations repeat themselves. Since a fresh assembly of parts is already being inserted into a template whilst a preceding assembly is being welded, idle times are avoided and production is continuous.

The working cycle may be fully automated so that a machine minder need merely place the several parts of the assembly into the recesses of the templates. When it is desired to stop the machine this can be done by a control bar extending along the length of the entire working surface. Should a collar become stuck the machine is automatically stopped. The entire conveying and feed mechanism as well as the pressing shear may be encased in sheet metal or the like for safety. Moreover, a counter for recording the number of working cycles and the number of processed assemblies may also be provided.

I claim:

1. A collar-making apparatus for thermoplastically bonding the several components of a shirt collar, including collar-interlining bases, bonding foils, and self-bonding cornerpieces, together, comprising, means for supporting the components to be joined together, a plurality of electrically heated weld punches for thermoplastically bonding the several components together, means for pressing the several components together against said electrically heated weld punches, said pressing means being selectively heated and an adjustable template formed in the shape of the several components to be joined together, said template positioned between said heated weld punches and said pressing means, whereby the several components to be joined together and supported on said support means have their edges located and aligned with each other by said template.

2. A collar-making apparatus as claimed in claim 1, wherein said aligning template comprises a three-level template, including an upper level, and intermediate level, and a bottom level, said bottom level positioned relative to said components to be joined for receiving the self-bonding cornerpieces, said intermediate level positioned for receiving the bonding foil of said components, and said upper level positioned for receiving the interlining base, said upper, intermediate and lower levels of said template assembly aligned with each other, whereby the several components to be joined together are maintained in alignment during the bonding process.

3. A collar-making apparatus as claimed in claim 2, wherein said template has openings therethrough aligned with said weld punches.

4. A collar-making apparatus as claimed in claim 3, wherein one of said openings corresponds to the size and shape of the self-bonding cornerpiece component to be joined, whereby said opening defines said bottom level of said template.

5. A collar-making apparatus as claimed in claim 1, wherein said template is constructed of cardboard.

6. A collar-making apparatus as claimed in claim 1, wherein said template is constructed of plastic material.

7. A collar-making apparatus as claimed in claim 1, wherein said template is formed in two separate parts, and further comprising at least one guide rail attached to said support means, said two parts of said template being adjustably guided on said guide rail, whereby said template may be adjusted to correspond to the size of the collar being made.

8. A collar-making apparatus as claimed in claim 1, wherein said weld punches are positioned below said support means and adapted to be advanced through said support means into said components to be joined together, said pressing means being positioned above said template and support means and adapted to be lowered onto said template.

9. A collar-making apparatus as claimed in claim 1, further comprising a template carrier mounted on said support means for movably conveying said template into said collar-making apparatus.

10. A collar-making apparatus as claimed in claim 9, wherein said templates are attached to said template carrier by means of magnetic studs.

11. A collar-making apparatus as claimed in claim 9, further comprising a conveyor means for conveying said template carrier into said bonding machine.

12. A collar-making apparatus as claimed in claim 11, further comprising a plurality of template carriers and templates mounted on said conveying means and including a common adjusting means for simultaneously adjusting all templates thereon.

13. A collar-making apparatus as claimed in claim 12, further comprising adjusting means operated in conjunction with said template-adjusting means for simultaneously adjusting the position of said weld punches to correspond to the adjusted positions of the templates.